United States Patent [19]

Foolen

[11] 4,288,106
[45] Sep. 8, 1981

[54] ROTATABLE SWIVEL FOR ONE OR MORE CONDUITS

[75] Inventor: Jan A. Foolen, Eze-sur-mer, France

[73] Assignee: Single Buoy Moorings Inc., Fribourg, Switzerland

[21] Appl. No.: 105,523

[22] Filed: Dec. 20, 1979

[30] Foreign Application Priority Data

Dec. 22, 1978 [NL] Netherlands .......................... 7812499

[51] Int. Cl.³ .............................................. F16L 39/04
[52] U.S. Cl. ..................................... 285/136; 285/190
[58] Field of Search ................................. 285/136, 190

[56] References Cited

U.S. PATENT DOCUMENTS

| 2,659,615 | 11/1953 | McClain | 285/190 X |
|---|---|---|---|
| 2,768,843 | 10/1956 | Zeilman | 285/136 X |
| 2,943,868 | 7/1960 | Hanback | 285/190 X |
| 3,698,433 | 10/1972 | Dobler et al. | 285/136 X |
| 4,052,090 | 10/1977 | Stafford | 285/136 X |
| 4,098,455 | 7/1978 | Ammann et al. | 285/190 X |
| 4,126,336 | 11/1978 | Ortloff et al. | 285/136 |

FOREIGN PATENT DOCUMENTS

| 1455464 | 9/1966 | France | 285/190 |
|---|---|---|---|
| 2298757 | 8/1976 | France . | |
| 7310795 | 2/1974 | Netherlands . | |
| 7603915 | 10/1977 | Netherlands . | |
| 263203 | 8/1949 | Switzerland | 285/190 |

Primary Examiner—Thomas F. Callaghan
Attorney, Agent, or Firm—Young & Thompson

[57] ABSTRACT

The invention relates to a rotatable swivel for one or more conduits said swivel comprising a plurality of annual chambers (4) formed by identical inner and outer wall portions (3 and 2 respectively), said wall portions (3,2) being rotatably supported with respect to each other by means of inner and outer bearing race ways (7 and 10 respectively) which are connected to an end face of the corresponding inner and outer wall portions (3,2). The outer wall portions (2) may be interconnected by means of bolts (15) and the inner wall portions (3) by means of cams (19) engaging into recesses (17, 18) or a ring (16) located at the level of the bearings (6) present between adjacent chambers (4).

7 Claims, 4 Drawing Figures

ROTATABLE SWIVEL FOR ONE OR MORE CONDUITS

The invention relates to a rotatable swivel for one or more conduits comprising one or more annular chambers each of which includes a fixed wall portion and a wall portion rotatably mounted with respect thereto, said wall portions being supported on each other by means of radially and axially operative bearings and being sealed with respect to each other, while each wall portion possesses one or more inlet and outlet line connections, respectively.

A similar rotatable swivel is known for instance from the Dutch Patent Application No. 7310795 laid open to inspection. In this known swivel a number of annular chambers are arranged around a stationary core which annular chambers are arranged rotatably on bearings with respect to the core and are sealed with respect thereto and have been situated above each other. The core consists of several concentrically arranged casing parts each possessing a line connection at a location below the rotatable parts in which each of the concentric channels possesses an outlet in one of the rotatable parts in such a manner that the lowest of the rotatable parts is connected to the outer one of the concentric chambers, the next one to a chamber situated somewhat more inwardly, etc.

This known swivel has the disadvantage that repair work, for instance the replacement of seals, is extraordinarily complicated. The replacement of for instance a seal of the bottom chamber requires the taking apart and subsequent reassembling of the bearings and seals per se of all the chambers situated thereabove, while running the risk of damage and fouling.

The object of the invention is to provide a rotatable joint not subject to the above disadvantage.

In accordance with the invention this object is attained in the first place in that all chambers are the same in such a manner that all inner wall portions are identical to each other and all outer wall portions are identical to each other while the inner wall portions surround a central aperture through which the connection or connections runs or run, respectively. By conferring essentially the same length on the wall portions of each chamber and having the connections run within the central aperture of each chamber it becomes possible in principle to disassemble one or more chambers including the bearings and seals thereof as a unit and to remove the same from between other chambers, thus achieving that said units may be prepared, repaired and be kept as spare units under suitable conditions. Moreover it should be remarked that upon reassembling such a unit these do not have to be aligned mutually. In case of several chambers situated above each other the lines will run through the successive apertures. When connected to the connection means of the inner wall portions these lines provide already a certain localization of the successive inner wall portions with respect to each other. In this case however it is preferred in accordance with the present invention to join the outer wall portions and/or inner wall portions fixedly to each other. Preferably the outer wall portions are joined together because the connection will then remain easily accessible. In this case it is preferred also to join the inner wall portions to each other in the circumferential direction by means of interlocking lugs.

In the rotatable swivel according to the invention the inner wall portions and outer wall portions may be supported with respect to each other in the usual way by means of axially-radially operative bearings, i.e. by providing bearings at the locations close to the seals between inner and outer wall portion for instance in a way as is known from the above mentioned Dutch Patent Application No. 7310795.

An effective solution is obtained in accordance with the invention by accommodating bearings between the chamber wall portions and connecting each one of the rings of the bearings to at least one corresponding chamber wall portion. The bearings will then be located at one end of each chamber and in case of a plurality of chambers bearings will consequently also be present between the chambers, it being sufficient in the latter case that the outer ring of such an intermediate bearing be fastened to one of the adjoining chamber wall portions and the inner ring thereof to the other adjoining chamber wall portion.

In this case there does not exist a connection between the inner wall portions. If a mutual locking of these portions in the circumferential direction is desired such may be achieved by means of a lug on the one portion locking in a recess of the other portion. In accordance with the invention it is however preferred to provide a ring at the location of each bearing situated between the chambers which ring provides for the lug connection by means of lugs and recesses. In the axial direction this ring has a loose connection which in the circumferential direction is fixed to such an extent that the inner wall portions of the successive chambers may not rotate with respect to each other but which on the other hand provides for a sufficient clearence so that it is not necessary to align the bearings of the different units with respect to each other.

The invention will now be elucidated in further detail with reference to the annexed drawings showing one embodiment of the invention.

Figure 1:
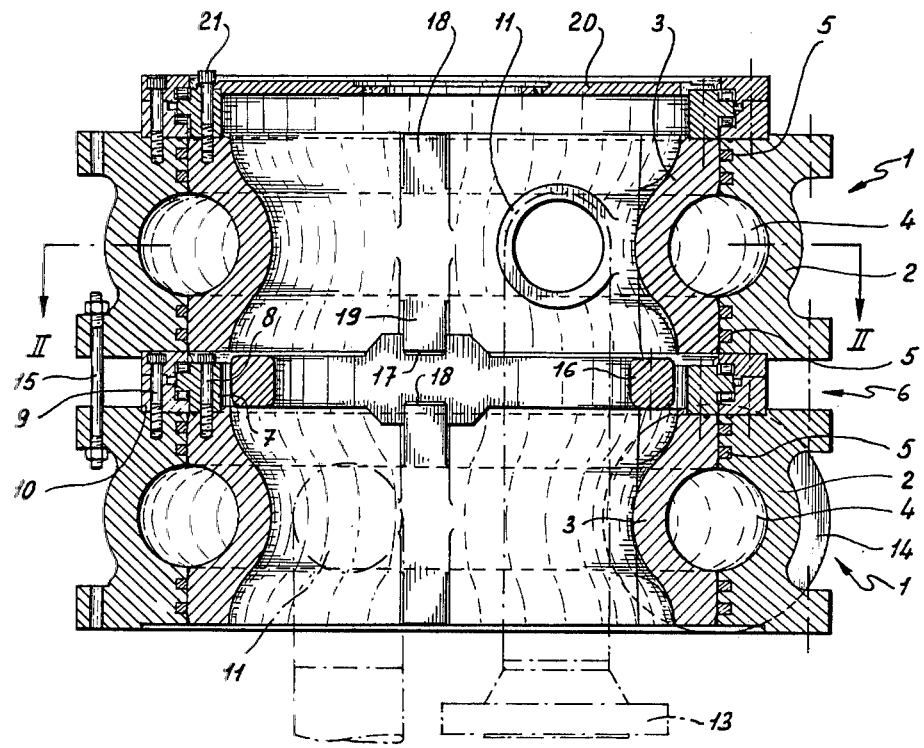
FIG. 1 shows a longitudinal section along the line I—I in FIG. 2.
Figure 2:
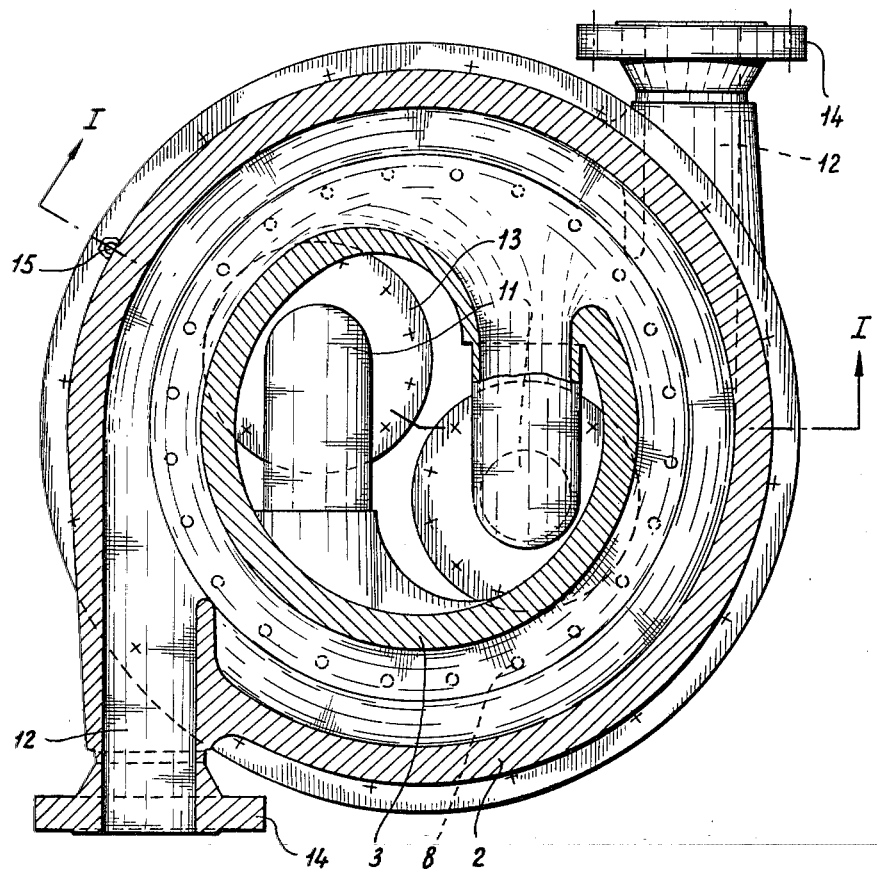
FIG. 2 shows a horizontal section of one chamber along the line II—II in FIG. 1.
Figure 3:
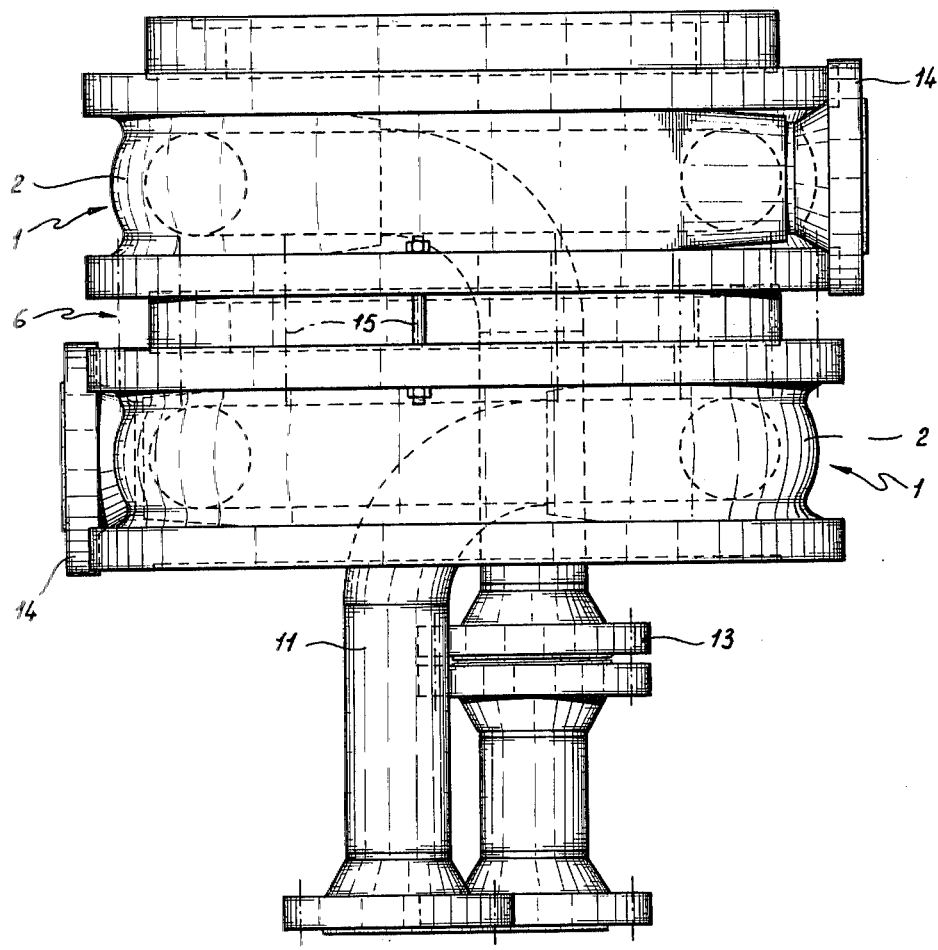
FIG. 3 represents a side elevation.

With reference to the drawings there is shown a rotatable swivel including two chambers. Each chamber 1 consists of an outer ring 2 and an inner ring 3 constituting together an essentially annular channel 4. Between the outer ring 2 and the inner ring 3 there have been provided seals 5 which in the shown example are located in grooves within the inner wall of the outer ring 2. To each chamber there is fastened an axially-radially operative bearing 6 the inner raceway 7 of which is fastened to the inner ring 3 by means of bolts 8 and the outer raceway 10 of which is fastened to the outer ring 2 by means of bolts 9. There is shown a roller bearing having axially operative rollers and radially operative rollers, for example of the Rote-Erde-type.

Each channel 4 possesses an inlet connection 11 and an outlet connection 12 each of which has a flange 13 and 14, respectively, for connecting to (not shown) conduits.

The outer rings 2 of the chambers placed on top of each other are connected to each other by means of bolts 15. Between the inner rings 3 there is an annular coupling means 16 at the level of bearing which coupling means has recesses 17, 18 in which lugs 19 of the inner ring 3 may be locked. The inner rings 3 are therefore coupled to each other in the circumferential direction. This coupling is a loosely fixed connection which will be released immediately when the chambers are moved apart.

Although only two chambers have been shown in the drawing it will be evident that more than two chambers may be joined together in the indicated manner.

Likewise it is conceivable that each wall portion include more than one chamber to which several inlet and outlet conduits may be connected. In case of the latter type it is of course possible to join some of them which may be disassembled and reassembled as a unit.

From the embodiment shown in the drawings it will be clear that the disengagement of the conduit from a flange 14 may be effected without difficulties. Upon removal of the bolts 15 and the disengagement of the flange 13 the upper chamber 1 may be removed in an upward direction.

The flange 13 may however also be located at the level of the ring 16.

Figure 4:
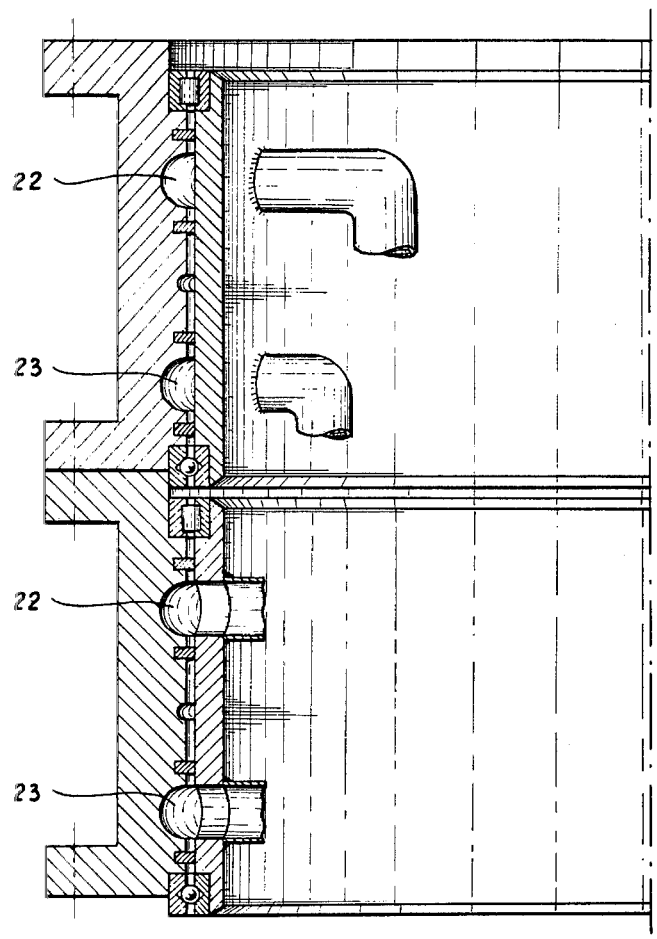
FIG. 4 shows diagrammatically another embodiment.

FIG. 4 discloses an embodiment in which each edge portion includes more than one chamber 22, 23.

I claim:

1. In a rotatable swivel for conduits comprising annular chambers each of which includes a fixed wall portion and a wall portion rotatably mounted with respect thereto, said wall portions being supported on each other by means of radially and axially operative bearings and being sealed with respect to each other, each wall portion having inlet and outlet line connections; the improvement in which all chambers are the same in such a manner that all inner wall portions (3) are identical and all outer wall portions (2) are identical, said inner wall portions (3) surrounding a central aperture through which said connections (11, 13) run.

2. A rotatable swivel as claimed in claim 1, in which said outer wall portions are all fixedly joined to each other.

3. A rotatable swivel as claimed in claim 1, in which all said inner wall portions are fixedly joined to each other.

4. A rotatable swivel as claimed in claim 1, in which the inner wall portions are coupled to each other by means of lugs in the circumferential direction.

5. A rotatable swivel as claimed in claim 1, said bearings including raceway rings connected to at least one corresponding said wall portion.

6. A rotatable swivel as claimed in claim 1, and a ring within said bearings, said ring being secured in the circumferential direction to said inner wall portions by lugs and recesses.

7. A rotatable swivel as claimed in claim 1, in which each wall portion defines more than one said chamber.

* * * * *